June 29, 1965            I. FEUER            3,192,426
ELECTROLUMINESCENT CONDENSERS HAVING POROUS ELEMENT
Filed July 27, 1962
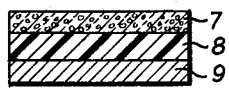
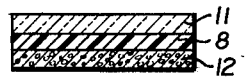
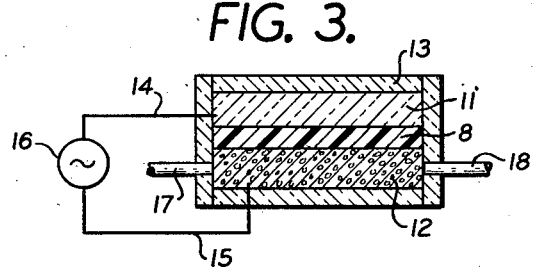
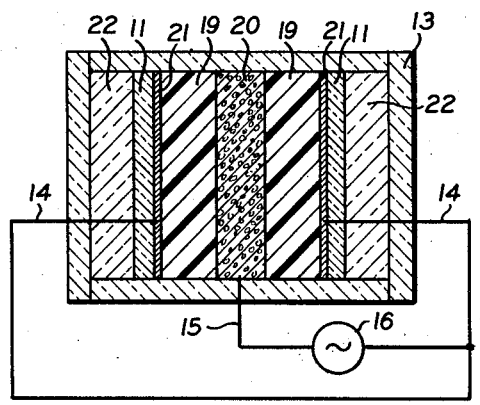
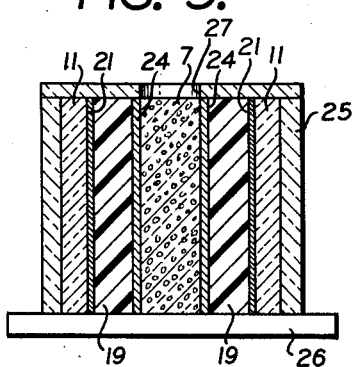
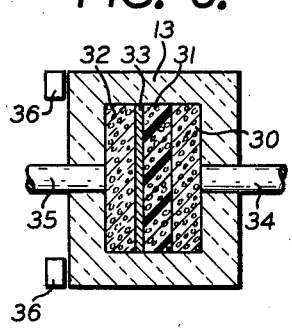
INVENTOR
IRVING FEUER
BY
ATTORNEYS.

United States Patent Office 3,192,426
Patented June 29, 1965

3,192,426
ELECTROLUMINESCENT CONDENSERS HAVING POROUS ELEMENT
Irving Feuer, New York, N.Y., assignor to Canrad Precision Industries Inc., New York, N.Y., a corporation of New York
Filed July 27, 1962, Ser. No. 212,861
7 Claims. (Cl. 313—108)

This invention relates to electroluminescent condensers or cells and provides cells having a porous element whereby improved cell operation is provided, or the cell can be used for measuring and testing purposes.

Electroluminescent condensers usually are made up of a layer of phosphor and dielectric interposed between two electrodes. Upon applying an alternating voltage to the electrodes, the phosphor luminesces, and, the cell being provided with transparent means for emission of light from the phosphor, visible light is provided by the cell. Usually, one of the electrodes is transparent and serves as the transparent means for emission of light from the phosphor. The other electrode can be of metal, though it too can be transparent.

According to the invention, an electroluminescent condenser includes an electrode, a layer of phosphor and dielectric material over the electrode and an electrode over the layer of phosphor and dielectric, and further includes means defining a network of intercommunicating pores for transfer of material with respect to the layer of phosphor and dielectric. The porosity characterizing the cells of the invention can be a porous element in communication with the layer of phosphor and dielectric material for interchange of material between the layer of phosphor and dielectric and said porous element. Such an element can be, for exatmple, a porous electrode. The porosity could also be provided by the form of the layer of phosphor and dielectric as this layer can be made porous to provide porosity according to the invention, or natural porosity of such a layer can be utilized.

A porous element according to the invention can be used as a reservoir for liquid dielectric to supply liquid dielectric to the layer of phosphor and dielectric, and when so used, the use of the porous element provides improved cell operation. Thus, the life of the cell and light output can be improved.

Further, porosity according to the invention can be used to accommodate the cell for use in measurement and testing. Thus, the porosity can be used, for example, to receive liquid dielectric from the layer of phosphor and dielectric in response to some condition such as temperature, pressure, chemical affinity, etc., or it can be used to transfer some material to the layer of phosphor and dielectric; or it can be used to expose the dielectric of the layer of phosphor and dielectric to some condition such as temperature or pressure; or it can be used to provide for exposing the dielectric to material, such as water vapor. In these various applications for measuring and testing, the condition of the dielectric in the layer of phosphor and dielectric is affected so that in turn the operation of the cell, i.e. light output or intensity of light output, is affected. Change in the operation of the cell can be observed, and such observation can be utilized with an appropriate correlation to effect the measurement or testing. Response of the cell to a change in a measured condition can be from a fraction of a second to weeks.

The porous element or porous condition can be associated with the layer of phosphor and dielectric material in various ways. Any association which permits interchange of material between the layer and the porous element, or transfer of material with respect to the said layer, can be used. Advantageously, one or both of the electrodes can be of porous material so that the electrode or electrodes can serve the dual function of an electrode and the porous element. If desired, both of the electrodes can be made of porous material.

Examples of porous materials which can be used are the following. Stainless steel Rigi brand porous metal of Pall Corp., e.g. from U.S. Patents 2,554,343 and 2,925,650. Rigi Type J (pore size: 10 microns) or Type B (pore size: 2 microns), can be used. The thickness of such material when used as an electrode or otherwise as a porous element, can be about 1–5 mils. Porous glass can also be used. Corning Glass Works markets such glass under the proprietary name Corning 7930. This porous glass can be made electroconductive as is known in the art, whereby use of the porous glass as an electrode is facilitated. Other materials suitable as porous elements are molecular sieves and micro traps as are marketed by W. R. Grace & Company. The porous material can be an absorbent material such as a fibrous asbestos mat. As a range for pore sizes, can be mentioned 20 angstrom units—20 microns, better, about 0.1 micron—10 microns.

A condenser according to the invention can be constructed using any solid or liquid dielectric suitable for use in electroluminescent condensers, and the condenser can then be used to sense conditions to which the dielectric or phosphor is sensitive. Condensers containing liquid dielectric are well suited for the purposes of the invention. The liquid dielectric can be, for example, castor oil, dimethyl phthalate, dimethyl malonate, or dibutyl phthalate, tricresyl phosphate, neohexanol, dimethyl phosphate, etc. The dielectric can be entirely liquid or it can be a solid dielectric plasticized with a liquid dielectric. Any dielectric is a liquid dielectric for the purposes of the invention, which tends to cover, by flow thereof, the phosphor particles with a film of dielectric. Any condenser known in the art as a liquid dielectric condenser (by which is meant that the condenser includes at least some liquid dielectric) is suitable for the purposes of the invention.

Cells according to the invention can be used at voltages and frequencies suitable for electroluminescent condensers.

The invention is further described in reference to the accompanying drawing of which:

FIG. 1 is a schematic, cross-section of the condenser having a porous transparent electrode;

FIG. 2 is a schematic, cross-section of the condenser having a porous metal electrode;

FIG. 3 is a schematic, cross-section of the condenser having a porous metal electrode with conduit means communicating with the electrode;

FIG. 4 is a schematic, cross-section of the condenser having a porous metal electrode disposed between two transparent electrodes;

FIG. 5 is a schematic, cross-section of a condenser according to the invention wherein the porous element is in communication with the exterior of the cell.

FIG. 6 is a schematic representation of a condenser according to the invention hooked up for testing service.

In the various views some parts are shown disproportionately large in order to better illustrate the construction. Also, like reference characters refer to corresponding parts.

Referring to the drawings, in FIG. 1, a condenser includes a porous glass electrode 7, layer of phosphor and dielectric 8, and metal electrode 9. In FIG. 2, a condenser includes glass electrode 11, layer of phosphor and dielectric 8, and porous metal electrode 12. In FIG. 3, an electrode as in FIG. 2 is hermetically sealed in a transparent housing, as is known in the art, and the electrodes are electrically connected by leads 14 and 15 to a source of alternating current 16. Further, in this embodiment, conduits 17 and 18 communicate the porous metal electrode with the exterior of the cell. Thus a material, e.g. a gas, may be passed through the porous electrode. If this gas contains a component to which the cell is sensitive in that operation, i.e. light output is effected by the presence of such component, then the cell can be used to detect the presence of such a component. Thus, operation of cells in which phosphor is the electroluminescent material and the phosphor is dispersed in a dielectric, are sensitive to moisture and hence, these cells can be used to test for water vapor. Cells can be calibrated to correlate moisture concentration with cell operation, and the correlation can be utilized in tests for moisture.

In FIG. 4, a cell is shown in somewhat more detail. Here a porous metal electrode 20 is interposed between two glass electrodes 11. The glass electrodes are conventional and have a layer of tin oxide 21 which renders them electroconductive. Further, the cell includes glass cover plates 22, and transparent outer housing 13.

In this embodiment (FIG. 4), the porous metal electrode 20 has absorbed therein dibutyl phthalate which is the liquid component of the dielectric of layers 21 of phosphor and dielectric. The layers 21 are of known composition. They contain phosphors dispersed in a dielectric composition which is Cyanocell brand cyanoethylated cellulose plasticized with dibuty phthalate in the proportion of 80% cyanoethylated cellulose and 20% dibutyl phthalate. The presence of dibutyl phthalate in the porous metal element 20 serves to maintain dibutyl phthalate present in the layer 19 in an amount improving operation of the condenser and prolongs its life.

In the embodiment of FIG. 5, porous glass electrode 7 is interposed between glass electrodes 11. The porous glass electrode is provided with films 24 of tin oxide to render it electroconductive. The condenser is housed in a transparent covering 25 mounted on a base 26 and having an aperture 27 which communicates the porous electrode with the exterior of the cell. The layer of phosphor and dielectric is of the composition described in reference to FIG. 4. In this embodiment (FIG. 5), since the porous glass is in communication with the exterior of the cell, conditions such as pressure will effect operation of the cell. Thus, if the porous electrode is exposed to a vacuum maintained exterior to the cell, loss of dibutyl phthalate from the layer 19 will occur due to evaporation. This will effect operation of the cell, and, from a previously obtained correlation, the vacuum can be measured by observing cell operation, i.e. light output.

In the embodiment shown in FIG. 6, a condenser is contained in housing 13 and is made up of porous metal electrode 30, layer of phosphor and dielectric material 31, and porous glass electrode 32 having electroconductive coating 33. The condenser is outfitted with terminal connectors (not shown). The layer 31 is a solid Cyanocell dielectric matrix in which the phosphor particles are dispersed and this layer is naturally porous. An inlet 34 and an outlet 35 are provided in the condenser so that fluid can be passed through the electrodes and layer of phosphor and dielectric. The fluid passed through the cell can be, for example, neohexane and so long as the composition of the fluid does not change, operation of the cell in emitting light will be constant. A change in composition of the fluid will mean a change in emitted light. Change can be sensed by photocells 36 and this can operate a response device (not shown) such as an alarm, relay, or the like.

A condenser according to the invention is capable of many applications in measuring and testing. In addition to those mentioned above, a condenser as in FIG. 4, except that the porous electrode 20 is free of dibutyl phthalate can be used to measure temperature. Thus, high temperature would cause evaporation of the dibutyl phthalate from the layer 19. The vapor would be absorbed by the porous element 20 and operation of the cell would be effected. Condensers of the invention can also be used for chemical structural analysis.

While the invention has been described with reference to particular embodiments thereof, various modifications will occur to those skilled in the art. It is desired to secure by these Letters Patent all such variations as are within the scope of the appended claims.

What is claimed is:

1. An electroluminescent condenser comprising an electrode, a layer of phosphor and dielectric material over said electrode and an electrode over the layer of phosphor and dielectric, and further comprising a porous element in communication with said layer of phosphor and dielectric for interchange of material between the layer of phosphor and dielectric and said porous element.

2. An electroluminescent condenser according to claim 1, said porous electrode having absorbed therein liquid dielectric for supply of dielectric to the layer of phosphor and dielectric.

3. An electroluminescent cell according to claim 1, said cell including a housing, and means communicating the porous element with the exterior of the cell.

4. An electroluminescent condenser comprising a porous electrode, a layer of phosphor and dielectric material over said electrode and an electrode over the layer of phosphor and dielectric, said porous electrode communicating with the layer of phosphor and dielectric material for interchange of material between the porous electrode and said layer.

5. An electroluminescent condenser according to claim 4, said porous electrode having absorbed therein liquid dielectric for supply of dielectric to the layer of phosphor and dielectric.

6. An electroluminescent condenser comprising an electrode, a layer of phosphor and dielectric material over said electrode and a transparent electrode over the layer of phosphor and dielectric, said transparent electrode being porous for interchange of material between the porous electrode and said layer.

7. An electroluminescent condenser comprising an electrode, a layer of phosphor and dielectric material over said electrode and an electrode over the layer of phosphor and dielectric, the condenser including means defining a network of intercommunicating pores for transfer of material with respect to the layer of phosphor and dielectric, and conduit means communicating the network of intercommunicating pores with the exterior of the housing.

References Cited by the Examiner
UNITED STATES PATENTS

| | | | |
|---|---|---|---|
| 2,976,728 | 3/61 | Brogan et al. | 73—336.5 |
| 3,153,739 | 10/64 | Graffenried | 313—108.1 |

GEORGE N. WESTBY, *Primary Examiner.*